US008593528B2

(12) United States Patent
Harding et al.

(10) Patent No.: US 8,593,528 B2
(45) Date of Patent: Nov. 26, 2013

(54) METHOD AND SYSTEM FOR MITIGATING SEESAWING EFFECT DURING AUTOFOCUS

(75) Inventors: Cressida Harding, Burwell (GB); David Plowman, Great Chesterford (GB)

(73) Assignee: Broadcom Corporation, Irvine, CA (US)

( * ) Notice: Subject to any disclaimer, the term of this patent is extended or adjusted under 35 U.S.C. 154(b) by 273 days.

(21) Appl. No.: 12/767,915

(22) Filed: Apr. 27, 2010

(65) Prior Publication Data

US 2011/0254995 A1 Oct. 20, 2011

Related U.S. Application Data

(60) Provisional application No. 61/324,374, filed on Apr. 15, 2010.

(51) Int. Cl.
*H04N 5/228* (2006.01)
*H04N 5/232* (2006.01)
*G03B 13/00* (2006.01)

(52) U.S. Cl.
USPC .................... 348/208.12; 348/208.6; 348/352

(58) Field of Classification Search
USPC .............. 348/208.4, 208.6, 208.12, 345, 347, 348/349, 352
See application file for complete search history.

(56) References Cited

U.S. PATENT DOCUMENTS

| | | | | |
|---|---|---|---|---|
| 4,284,331 | A * | 8/1981 | Tanaka ........................... | 359/683 |
| 5,557,358 | A * | 9/1996 | Mukai et al. ................... | 396/296 |
| 5,629,735 | A * | 5/1997 | Kaneda et al. ................. | 348/350 |
| 6,906,746 | B2 * | 6/2005 | Hijishiri et al. ............ | 348/240.2 |
| 7,589,768 | B2 * | 9/2009 | Morimoto .................. | 348/240.1 |
| 7,701,491 | B2 * | 4/2010 | Abe et al. ..................... | 348/240.2 |
| 7,844,176 | B2 * | 11/2010 | Kunishige et al. ............ | 396/128 |
| 7,889,268 | B2 * | 2/2011 | Terada .......................... | 348/345 |
| 2003/0063195 | A1 * | 4/2003 | Okisu et al. .............. | 348/208.16 |
| 2006/0103731 | A1 * | 5/2006 | Pilu et al. ................. | 348/207.99 |
| 2009/0079842 | A1 * | 3/2009 | Wilson ....................... | 348/222.1 |
| 2010/0013977 | A1 * | 1/2010 | Suzuki ..................... | 348/333.11 |
| 2010/0329550 | A1 * | 12/2010 | Cheatle ........................ | 382/165 |

OTHER PUBLICATIONS

David Rasnake, Panasonic Lumix DMC-ZS3 Review, DigitalCameraReview.com—Panasonic DMC-ZS3 Review, Mar. 27, 2009, pp. 1-18.

* cited by examiner

*Primary Examiner* — Daniel M Pasiewicz
(74) *Attorney, Agent, or Firm* — Brinks Gilson & Lione

(57) ABSTRACT

A mobile multimedia device may be operable to crop a series of image samples received during an autofocus operation. Each of the cropped image samples may be scaled by the mobile multimedia device to fit a display unit in the mobile multimedia device. Each of the scaled image samples may then be displayed on the display unit for viewing during the autofocus operation. The received image samples may be cropped based on an operating mode in which the mobile multimedia device is currently operating. The autofocus operation may be initiated utilizing a shutter button in the mobile multimedia device. The autofocus operation may be terminated when a desired focus is achieved. After the autofocus operation is terminated, the mobile multimedia device may be operable to display one or more image samples received after the termination of the autofocus operation for continuous viewing, with or without further cropping and scaling.

19 Claims, 4 Drawing Sheets

METHOD AND SYSTEM FOR MITIGATING SEESAWING EFFECT DURING AUTOFOCUS

CROSS-REFERENCE TO RELATED APPLICATIONS/INCORPORATION BY REFERENCE

This patent application makes reference to, claims priority to, and claims benefit from U.S. Provisional Application Ser. No. 61/324,374, which was filed on Apr. 15, 2010.

The above stated application is hereby incorporated herein by reference in its entirety.

FIELD OF THE INVENTION

Certain embodiments of the invention relate to communication devices that capture images. More specifically, certain embodiments of the invention relate to a method and system for mitigating seesawing effect during autofocus.

BACKGROUND OF THE INVENTION

Image and video capabilities may be incorporated into a wide range of devices such as, for example, mobile phones, digital televisions, digital direct broadcast systems, digital recording devices, gaming consoles and the like. Mobile phones with built-in cameras, or camera phones, have become prevalent in the mobile phone market, due to the low cost of CMOS image sensors and the ever increasing customer demand for more advanced mobile phones with image and video capabilities. As camera phones have become more widespread, their usefulness has been demonstrated in many applications, such as casual photography, but have also been utilized in more serious applications such as crime prevention, recording crimes as they occur, and news reporting.

Historically, the resolution of camera phones has been limited in comparison to comparison to typical digital cameras, due to the fact that they must be integrated into the small package of a mobile handset, limiting both the image sensor and lens size. In addition, because of the stringent power requirements of mobile handsets, large image sensors with advanced processing have been difficult to incorporate. However, due to advancements in image sensors, multimedia processors, and lens technology, the resolution of camera phones has steadily improved rivaling that of some digital cameras.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for mitigating seesawing effect during autofocus, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for mitigating seesawing effect during autofocus. In various embodiments of the invention, a mobile multimedia device may be operable to crop a series of image samples received during an autofocus operation when capturing one or more images for a scene. The autofocus operation may comprise, for example, a one-shot autofocus operation and/or a continuous autofocus operation. Each of the cropped image samples may then be scaled by the mobile multimedia device for viewing. Each of the scaled image samples may be displayed on a display unit, such as, for example, on a LCD or LED display in the mobile multimedia device for viewing during the autofocus operation. In this regard, the autofocus operation may be initiated for achieving a desired focus for capturing the one or more images for the scene. For example, the autofocus operation may be initiated by having a shutter button in the mobile multimedia device partially pressed, for example pressed halfway down. The autofocus operation may also be initiated by switching the operating mode of the mobile multimedia device to a video mode in the continuous autofocus case, for example. In an exemplary embodiment of the invention, the mobile multimedia device may be operable to crop the series of image samples received during the autofocus operation based on an operating mode in which the mobile multimedia device is currently operating. Each of the cropped image samples may be scaled, for example enlarged, to fit the display unit such as the LCD or LED display in the mobile multimedia device for viewing.

In an exemplary embodiment of the invention, the autofocus operation may be terminated by the mobile multimedia device when the desired focus for capturing the one or more images for the scene is achieved. After the autofocus operation is terminated due to the desired focus being achieved, the mobile multimedia device may be operable to continue displaying one or more image samples on the display unit. The image samples which may display unit. The image samples which may be received after the termination of the autofocus operation may be displayed for viewing with or without further cropping and scaling.

Figure 1:
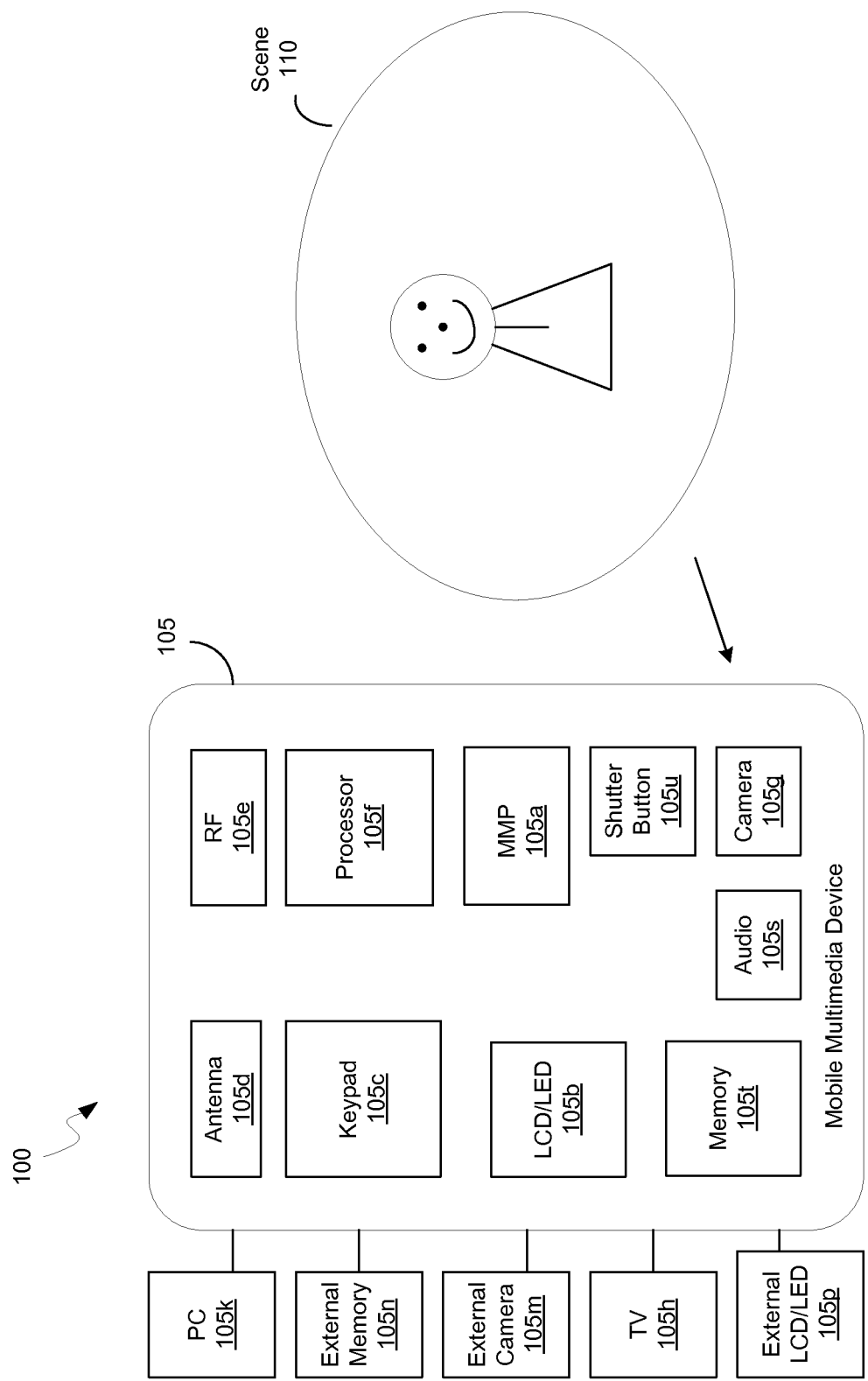
FIG. 1 is a block diagram illustrating an exemplary mobile multimedia system that is operable to mitigate seesawing effect during autofocus, in accordance with an embodiment of the invention.

FIG. 1 is a block diagram illustrating an exemplary mobile multimedia system that is operable to mitigate seesawing effect during autofocus, in accordance with an embodiment of the invention. Referring to FIG. 1, there is shown a mobile multimedia system 100. The mobile multimedia system 100 may comprise a mobile multimedia device 105, a TV 105*h*, a PC 105*k*, an external camera 105*m*, an external memory 105*n*, an external LCD or LED display 105*p* and a scene 110. The mobile multimedia device 105 may be a mobile phone or other handheld communication device.

The mobile multimedia device 105 may comprise suitable logic, circuitry, interfaces and/or code that may be operable to communicate radio signals across a wireless communication network. The mobile multimedia device 105 may be operable to process image, video and/or multimedia data. The mobile multimedia device 105 may comprise a mobile multimedia processor (MMP) 105*a*, a memory 105*t*, a processor 105*f*, an antenna 105*d*, an audio block 105*s*, a radio frequency (RF) block 105*e*, an LCD or LED display 105*b*, a keypad 105*c*, a camera 105*g* and a shutter button 105*u*.

The mobile multimedia processor (MMP) 105*a* may comprise suitable logic, circuitry, interfaces, and/or code that may be operable to perform image, video and/or multimedia processing for the mobile multimedia device 105. For example, the MMP 105*a* may be designed and optimized for video record/playback, mobile TV and 3D mobile gaming. The MMP 105*a* may perform a plurality of image processing techniques such as, for example, filtering, demosaic, lens shading correction, defective pixel correction, white balance, image compensation, Bayer interpolation, color transformation and post filtering. The MMP 105*a* may also comprise integrated interfaces, which may be utilized to support one or more external devices coupled to the mobile multimedia device 105. For example, the MMP 105*a* may support connections to a TV 105*h*, an external camera 105*m*, and an external LCD or LED display 105*p*. The MMP 105*a* may be communicatively coupled to the display 105*p*. The MMP 105*a* may be communicatively coupled to the memory 105*t* and/or the external memory 105*n*.

When capturing images for a scene such as the scene 110, a seesawing effect may occur. This seesawing effect occurs due to changes of the field of view, due to zoom-in and/or zoom-out of the camera 105*g* or lens movements of the camera 105*g*, during the autofocus operation. The field of view is the part of the scene 110 that is visible through the camera 105*g* at a particular position and orientation in space.

In an exemplary embodiment of the invention, the MMP 105*a* may be operable to mitigate seesawing effect for a viewer during an autofocus operation when capturing one or more images for a scene such as the scene 110. The autofocus operation may comprise, for example, a one-shot autofocus operation and/or a continuous autofocus operation. The one-shot autofocus operation comprises acquiring a desired focus for capturing an image of a scene in a single operation as opposed to continuously. The one-shot autofocus operation may be used for taking still photos, for example. The continuous autofocus operation comprises continuous adjustment of the focal distance of an object that is moving to ensure that the object continuously remains in focus. The continuous autofocus operation may be useful when shooting moving objects or capturing videos, for example. In this regard, the MMP 105*a* may be operable to crop and scale a series of image samples which may be received for viewing during the autofocus operation. Some portions of the edge of each of the image samples may be cropped off by the MMP 105*a* based on an operating mode in which the camera 105*g* is currently operating. For example, the amount cropped from the edge of an image sample may depend on the difference between maximum and minimum zoom settings for a given camera operating mode. The cropped image samples may be scaled, for example enlarged, to fit a display unit such as the LCD or LED display 105*b* or a viewfinder of the mobile multimedia device 105 for viewing during the autofocus operation. Accordingly, the field of view may be kept constant in the LCD or LED display 105*b* during the autofocus operation, and the seesawing effect may become less noticeable. The lens movements of the camera 105*g* during the autofocus operation may be hidden or may not be noticeable. The viewer may see the screen on the LCD or LED display 105*b* become blurry viewer may see the screen on the LCD or LED display 105*b* become blurry and then crisp while a desired focus is achieved, without noticeable changes of the field of view.

In an exemplary embodiment of the invention, after the completion or termination of the autofocus operation when a desired focus has been achieved, the MMP 105*a* may be operable to cause the display of the received one or more image samples, with or without the cropping and the resizing, on the LCD or LED display 105*b* for viewing.

The processor 105*f* may comprise suitable logic, circuitry, interfaces, and/or code that may be operable to control operations and processes in the mobile multimedia device 105. The processor 105*f* may be operable to process signals from the RF block 105*e* and/or the MMP 105*a*.

The memory 105*t* may comprise suitable logic, circuitry, interfaces and/or code that may be operable to store information such as executable instructions, data and/or database that may be utilized by the processor 105*f* and the multimedia processor 105*a*. The memory 105*t* may comprise RAM, ROM, low latency nonvolatile memory such as flash memory and/or other suitable electronic data storage.

In operation, the mobile multimedia device 105 may receive RF signals via the antenna 105*d*. Received RF signals may be processed by the RF block 105*e* and the RF signals may be further processed by the processor 105*f*. Audio and/or video data may be received from the external camera 105*m*, and image data may be received via the integrated camera 105*g*. During processing, the MMP 105*a* may utilize the external memory 105*n* for storing of processed data. Processed audio data may be communicated to the audio block 105*s* and processed video data may be communicated to the LCD or LED display 105*b*, the external LCD or LED display 105*p* and/or the TV 105*h*, for example. The keypad 105*c* may be utilized for communicating processing commands and/or other data, which may be required for image, audio or video data processing by the MMP 105*a*.

In an exemplary embodiment of the invention, the camera 105*g* may be operable to receive a series of image samples of the scene 110 during an autofocus operation when capturing one or more images for the scene 110. The autofocus operation may comprise, for example, a one-shot autofocus operation and/or a continuous autofocus operation. The MMP 105*a* may be operable to crop the series of image samples received during the autofocus operation. Some portions of the edge of each of the image samples may be removed by cropping by the MMP 105*a* based on an operating mode in which the camera 105*g* may be operating. For example, the amount of image sample data that may be cropped from an edge of an image sample may depend on the difference between maximum and minimum zoom settings for a given camera operating mode. Each of the cropped image samples may then be scaled or resized by the MMP 105*a* for viewing. For example, the cropped image samples may be enlarged to fit a display unit such as the LCD or LED display 105*b*, or a viewfinder of the mobile multimedia device 105. Each of the scaled image samples may then be displayed by a display unit, such as, for example, the LCD or LED display 105*b* for viewing during the autofocus operation. In this regard, the autofocus operation may be initiated to achieve a desired focus for capturing the one or more images for the scene 110 utilizing, for example, the shutter button 105*u*. For example, the autofocus operation may be initiated by partially depressing the shutter button 105*u*, for example, pressing the shutter button halfway down and/or for a specified period of time. The autofocus operation may also be initiated by switching the operating mode of the camera 105*g* to a video mode in the continuous autofocus case, for example.

In an exemplary embodiment of the invention, the autofocus operation may be terminated or completed when the desired focus for capturing the one or more images for the scene 110 is achieved. After the autofocus operation is terminated when the desired focus has been achieved, the LCD or LED display 105b may be operable to display one or more image samples which may be received after the termination of the autofocus operation, with or without the cropping and the scaling, for continuous viewing.

In another exemplary embodiment of the invention, the camera 105g may operate in the continuous autofocus mode for video capturing. In this instance, for example, the MMP 105a may be operable to crop and scale the captured images for viewing during the video capturing. Accordingly, the seesawing effect on the LCD or LED display 105b may be less noticeable during the video capturing.

Figure 2:
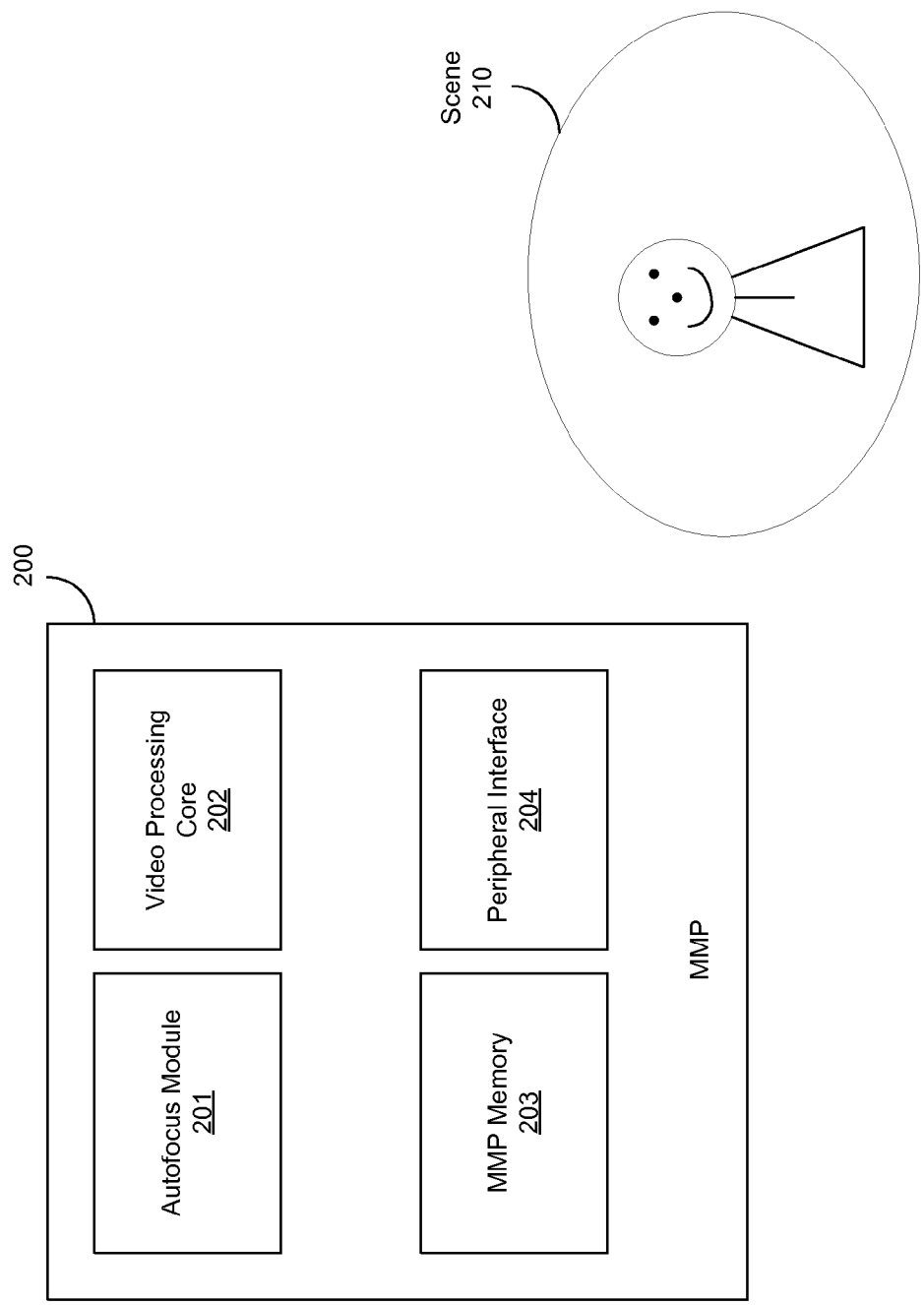
FIG. 2 is a block diagram illustrating an exemplary mobile multimedia processor that is operable to mitigate seesawing effect during autofocus, in accordance with an embodiment of the invention.

FIG. 2 is a block diagram illustrating an exemplary mobile multimedia processor that is operable to mitigate seesawing effect during autofocus, in accordance with an embodiment of the invention. Referring to FIG. 2, there is shown a mobile multimedia processor (MMP) 200 and a scene 210. The MMP 200 may comprise an autofocus module 201, a video processing core 202, a MMP memory 203 and a peripheral interface 204. The scene 210 may be substantially similar to the scene 110 in FIG. 1.

The autofocus module 201 may comprise suitable logic, circuitry, interfaces and/or code that may be operable to mitigate seesawing effect for a viewer during an autofocus operation when capturing one or more images for a scene such as the scene 210. The autofocus module 201 may be operable to crop and scale a series of image samples which may be received for viewing during the autofocus operation. Some portions of the edge of each of the image samples may be cropped off by the autofocus module 201 based on an operating mode in which the camera 105g is currently operating. For example, the amount of image sample data that is cropped from the edge of an image sample may depend on the difference between maximum and minimum zoom settings for a given camera operating mode. The cropped image samples may be scaled, for example enlarged, to fit a display unit such as the LCD or LED display 105b or a viewfinder for viewing during the autofocus operation.

In an exemplary embodiment of the invention, after the completion or termination of the autofocus operation when a desired focus has been achieved, the autofocus module 201 may be operable to cause the received one or more image samples to be displayed, with or without the cropping and the scaling, on the LCD or LED display 105b for viewing.

The video processing core 202 may comprise suitable logic, circuitry, interfaces and/or code that may be operable to provide high performance image, video and multimedia processing. The video processing core 202 is the core unit of the MMP 200. The architecture of the video processing core 202 may provide a flexible, low power, and high performance multimedia solution for a wide range of applications, including mobile applications, for example. By using dedicated hardware pipelines in the architecture of the video processing core 202, such low power consumption and high performance goals may be achieved. The video processing core 200 may support multiple capabilities, including image sensor processing, high rate high definition video encoding and decoding, 3D graphics, high speed JPEG encode and decode, audio codecs, image scaling, and/or LCD and TV outputs, for example.

The MMP memory 203 may comprise suitable logic, circuitry, interfaces and/or code that may be operable to store information such as executable instructions, data and/or database that may be utilized by the autofocus module 201 and the video processing core 202. The MMP memory 203 may comprise RAM, ROM, low latency nonvolatile memory such as flash memory and/or other suitable electronic data storage.

The peripheral interface 204 may comprise suitable logic, circuitry, interfaces and/or code that may be operable to provide interfaces to support peripherals. The peripheral interface 204 may support a plurality of peripherals such as, for example, camera, display controllers, HDTV, SDTV, digital audio, memory cards, host processor, universal serial bus (USB) devices, general purpose input/output (GPIO), switched-mode power supply (SMPS), and/or clock manager.

In operation, the autofocus module 201 may be operable to crop the series of image samples received during the autofocus operation. Some portions of the edge of each of the image samples may be removed for example, by cropping utilizing the autofocus module 201 based on an operating mode in which the camera 105g is currently operating. For example, the amount cropped from the edge of an image sample may depend on the difference between maximum and minimum zoom settings for a given camera operating mode. Each of the cropped image samples may then be scaled or resized by the autofocus scaled or resized by the autofocus module 201 for viewing. For example, the cropped image samples may be enlarged to fit a display unit such as the LCD or LED display 105b or a viewfinder of the mobile multimedia device 105. Each of the scaled or resized image samples may then be displayed on a display unit, such as, for example, on the LCD or LED display 105b for viewing during the autofocus operation.

In an exemplary embodiment of the invention, the autofocus operation may be terminated or completed when the desired focus for capturing the one or more images for the scene 210 is achieved. After the autofocus operation is terminated when the desired focus has been achieved, the autofocus module 201 may be operable to cause displaying of one or more image samples which may be received after the termination of the autofocus operation, with or without further cropping and scaling, on the LCD or LED display 105b for continuous viewing.

Figure 3:
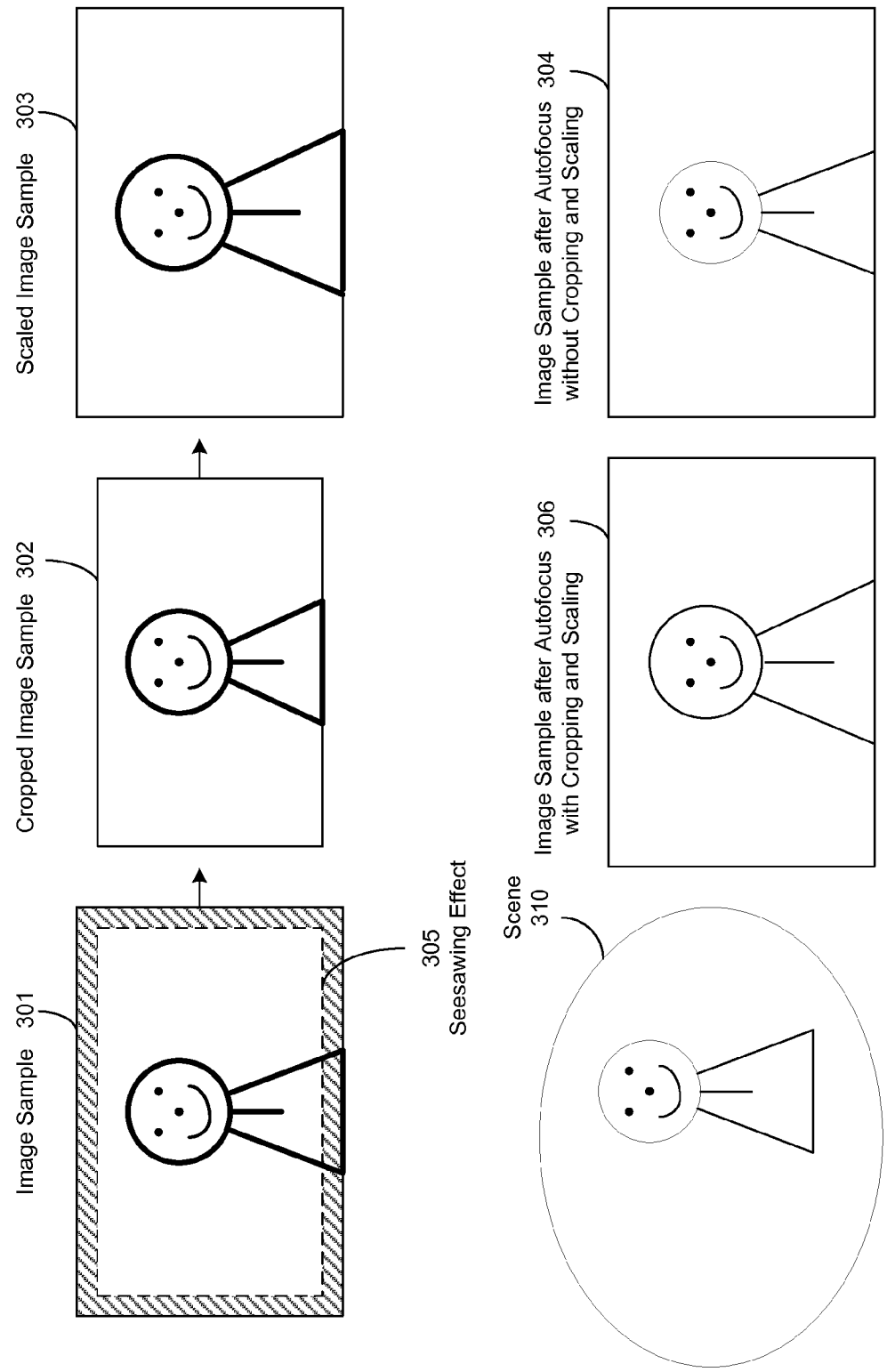
FIG. 3 is a block diagram illustrating an exemplary image cropping and resizing during autofocus, in accordance with an embodiment of the invention.

FIG. 3 is a block diagram illustrating an exemplary image cropping and resizing during autofocus, in accordance with an embodiment of the invention. Referring to FIG. 3, there is shown an image sample 301, a cropped image sample 302, a scaled image sample 303, an image sample after autofocus 304, an image sample after autofocus 306 and a scene 310. The scene 310 may be substantially similar to the scene 110 in FIG. 1.

During an autofocus operation when capturing one or more images for a scene such as the scene 310, a series of image samples such as the image sample 301 may be received by the camera 105g in the mobile multimedia device 105 for display on the LCD or LED display 105b in the mobile multimedia device 105. The image sample 301 may comprise a seesaw effect such as the seesawing effect 305. The seesawing effect occurs due to the changes of the field of view due to zoom-in and/or zoom-out operations of the camera 105g during the autofocus operation. In an exemplary embodiment of the invention, the MMP 105a in the mobile multimedia device 105 may be operable to crop the image sample 301 to create the cropped image sample 302 for mitigating the seesawing effect 305. The cropped image sample 302 may be scaled or resized such as, for example, enlarged to create the scaled image sample 303 to fit the screen of the LCD or LED display 105b. The sample 303 to fit the screen of the LCD or LED display 105b. The scaled image sample 303 may then be displayed on the LCD or LED display 105b for viewing.

Accordingly, the field of view may be kept constant in the LCD or LED display 105b during the autofocus operation, and the seesawing effect 305 may be eliminated or become less noticeable. A viewer may see the blurry image sample 303 on the LCD or LED display 105b without noticeable changes of the field of view.

In an exemplary embodiment of the invention, after a desired focus has been achieved, the MMP 105a may be operable to cause the display of one or more crisp image samples such as the full width image sample 304, which may be received by the camera 105g, on the LCD or LED display 105b without the cropping and the scaling for continuous viewing.

In another exemplary embodiment of the invention, after a desired focus has been achieved, the MMP 105a may be operable to cause the display of one or more crisp image samples, which may be received by the camera 105g, on the LCD or LED display 105b continuously with the cropping and the scaling for viewing, such as the image sample 306. In this instance, the final image may be captured with the cropping and the scaling in place, for example.

Figure 4:
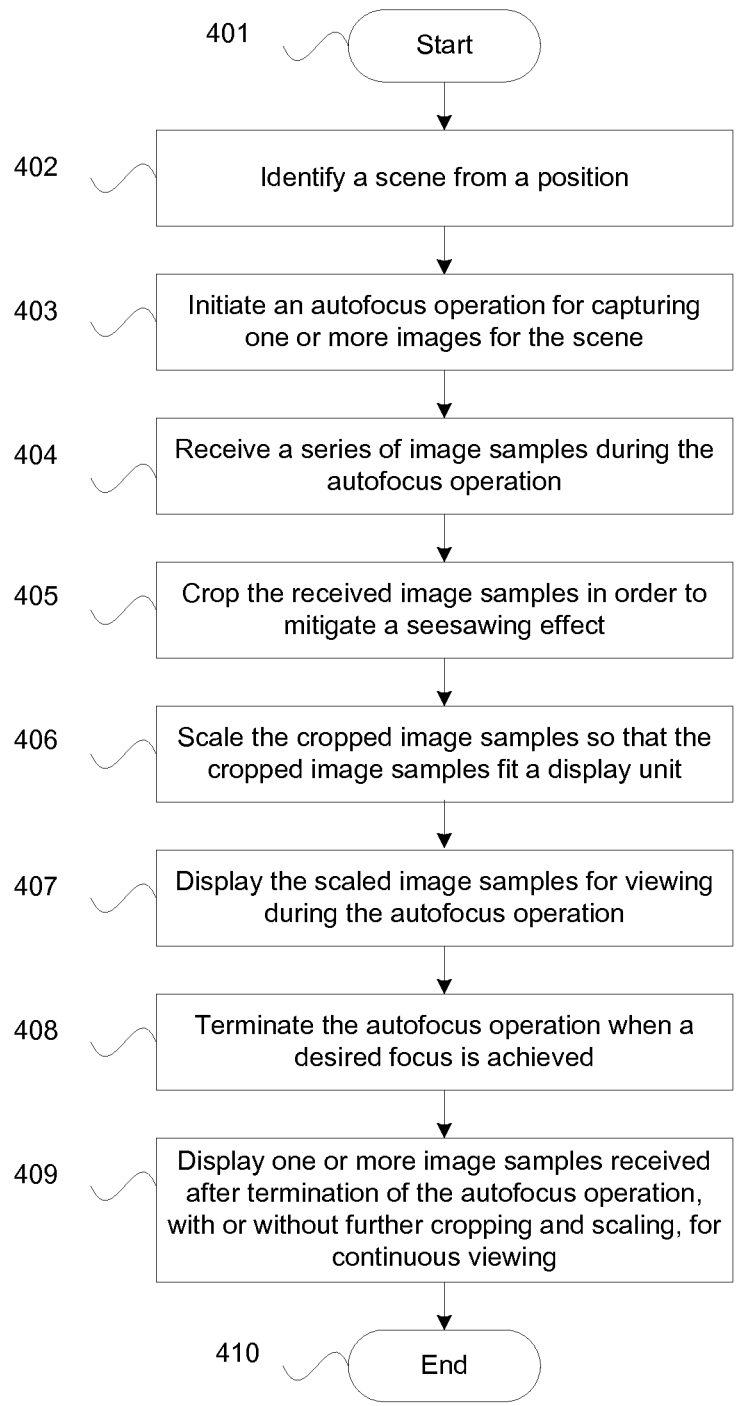
FIG. 4 is a flow chart illustrating exemplary steps for mitigating seesawing effect during autofocus, in accordance with an embodiment of the invention.

FIG. 4 is a flow chart illustrating exemplary steps for mitigating seesawing effect during autofocus, in accordance with an embodiment of the invention. Referring to FIG. 4, the exemplary steps start at step 401. In step 402, the mobile multimedia device 105 may be operable to identify a scene 110 from a position or particular viewing angle. In step 403, an autofocus operation for capturing one or more images for the scene 110 may be initiated, for example, by partially pressing the shutter button 105u in the mobile multimedia device 105, for example, by pressing it halfway down and/or for a specified time. In step 404, the camera 105g in the mobile multimedia device 105 may be operable to receive a series of image samples such as the image sample 301 during the autofocus operation. In step 405, the MMP 105a in the mobile multimedia device 105 may be operable to crop the received image samples such as the image sample 301 in order to mitigate a seesawing effect 305. In step 406, the MMP 105a may be operable to scale or resize the cropped MMP 105a may be operable to scale or resize the cropped image samples, such as the cropped image sample 302, so that the cropped image samples fit a display unit such as the LCD or LED display 105b in the mobile multimedia device 105. In step 407, the LCD or LED display 105b may be operable to display the scaled image samples such as the scaled image sample 303 for viewing during the autofocus operation. In step 408, the autofocus operation may be terminated by the camera 105g when a desired focus is achieved. In step 409, the LCD or LED display 105b may be operable to display one or more image samples such as the image sample 304 after termination of the autofocus operation, with or without further cropping and scaling, for continuous viewing. The exemplary steps may proceed to the end step 410.

In various embodiments of the invention, a MMP 105a in a mobile multimedia device 105 may be operable to crop a series of image samples such as the image sample 301 received during an autofocus operation when capturing one or more images for a scene such as the scene 310. The autofocus operation may comprise, for example, a one-shot autofocus operation and/or a continuous autofocus operation. Each of the cropped image samples such as the image sample 302 may then be scaled by the MMP 105a for viewing. Each of the scaled image samples such as the scaled image sample 303 may be displayed on a display unit, such as, for example, on a LCD or LED display 105b in the mobile multimedia device 105 for viewing during the autofocus operation. In this regard, the autofocus operation may be initiated for achieving a desired focus for capturing the one or more images for the scene 110. For example, the autofocus operation may be initiated by having a shutter button 105u in the mobile multimedia device 105 partially pressed, for example pressed halfway down. The autofocus operation may also be initiated by switching the operating mode of the camera 105g in the mobile multimedia device 105 to a video mode in the continuous autofocus case, for example. In an exemplary embodiment of the invention, the MMP 105 may be operable to crop the series of image samples such as the image sample 301 received during the autofocus operation based on an operating mode in which the camera 105g in the mobile multimedia device 105 is currently operating. Each of camera 105g in the mobile multimedia device 105 is currently operating. Each of the cropped image samples such as the cropped image sample 302 may be scaled, for example enlarged, to fit the display unit such as the LCD or LED display 105b for viewing.

In an exemplary embodiment of the invention, the autofocus operation may be terminated by the camera 105g when the desired focus for capturing the one or more images for the scene 110 is achieved. After the autofocus operation is terminated due to the desired focus being achieved, the MMP 105a may be operable to continue displaying one or more image samples such as the image sample 304 on the LCD or LED display 105b. The image sample 304 which may be received after the termination of the autofocus operation may be displayed for viewing with or without further cropping and scaling.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for mitigating seesawing effect during autofocus.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing images, the method comprising:
in a mobile multimedia device:
focusing a field of view through an autofocus operation when capturing video, the autofocus operation causing a change in the field of view in a series of image samples;
cropping the series of image samples received during the autofocus operation;
scaling the cropped image samples of said cropped series for viewing; and
displaying the scaled image samples of said scaled series on a display unit in said mobile multimedia device for said viewing during said autofocus operation.

2. The method according to claim 1, comprising initiating said autofocus operation for achieving a desired focus for said capturing said one or more images for said scene.

3. The method according to claim 1, comprising cropping said series of image samples based on an operating mode in which said mobile multimedia device is currently operating.

4. The method according to claim 1, comprising scaling the cropped image samples of said cropped series to fit said display unit for said viewing.

5. The method according to claim 1, comprising terminating said autofocus operation when a desired focus for said capturing said one or more images for said scene is achieved.

6. The method according to claim 5, comprising, after said terminating of said autofocus operation, displaying said one or more scaled image samples on said display unit for said viewing without further cropping and scaling.

7. The method according to claim 5, after said terminating of said autofocus operation, displaying said one or more scaled image samples on said display unit for said viewing continuously with cropping and scaling.

8. The method according to claim 1, wherein said autofocus operation comprises a one-shot autofocus operation.

9. A system for processing images, the system comprising:
one or more processors and/or circuits for use in a mobile multimedia device, wherein said one or more processors and/or circuits are operable to perform an image processing operation to:
crop a series of image samples received during an autofocus operation when capturing one or more images for a scene;
scale the image samples of said cropped series of image samples for viewing; and
display the image samples of said scaled series of image samples on a display unit in said mobile multimedia device for said viewing during said autofocus operation,
wherein the image processing operation maintains a constant field of view with respect to a deviation in the field of view caused by the autofocus operation when capturing video.

10. The system according to claim 9, wherein said one or more processors and/or circuits are operable to initiate said autofocus operation for achieving a desired focus for said capturing said one or more images for said scene.

11. The system according to claim 9, wherein said one or more processors and/or circuits are operable to crop said series of image samples based on an operating mode in which said mobile multimedia device is currently operating.

12. The system according to claim 9, wherein said one or more processors and/or circuits are operable to scale the cropped image samples of said cropped series to fit said display unit for said viewing.

13. The system according to claim 9, wherein said one or more processors and/or circuits are operable to terminate said autofocus operation when a desired focus for said capturing said one or more images for said scene is achieved.

14. The system according to claim 13, wherein, after said terminating of said autofocus operation, said one or more processors and/or circuits are operable to display said one or more scaled image samples on said display unit for said viewing without further cropping and scaling.

15. The system according to claim 13, wherein, after said terminating of said autofocus operation, said one or more processors and/or circuits are operable to display said one or more scaled image samples on said display unit for said viewing continuously with cropping and scaling.

16. The system according to claim 9, wherein said autofocus operation comprises a one-shot autofocus operation.

17. The method according to claim 1, comprising cropping each of the image samples of the series of image samples based on a difference between a maximum zoom setting and a minimum zoom setting for a camera operating mode.

18. The method according to claim 1, further comprising storing the captured video or the still photo.

19. A method for processing images, the method comprising:
in a mobile multimedia device:
an autofocus operation causing a field of view variation in a series of image samples;
cropping the series of image samples received during the autofocus operation to limit the field of view variation when capturing a final image for a scene;
scaling the cropped image samples of the cropped series of image samples for viewing;
displaying the scaled image samples of the scaled series of image samples on a display unit in the mobile multimedia device for the viewing during the autofocus operation; and
capturing the final image with the cropping and the scaling in place, said autofocus operation comprising a continuous autofocus operation that is used when capturing a final image.

* * * * *